United States Patent [19]

Okina et al.

[11] Patent Number: 4,952,358
[45] Date of Patent: Aug. 28, 1990

[54] METHOD OF MANUFACTURING AN INTERIOR MEMBER FOR VEHICLES

[75] Inventors: Toyohiko Okina; Hiroshi Goto; Fumio Kousaka; Akinori Teranishi; Satoshi Kawabata; Tetsuo Ohyama; Makoto Ohya; Norio Kozaki, all of Anjo, Japan

[73] Assignee: Inoue MTP Kabushiki Kaisha, Japan

[21] Appl. No.: 346,459

[22] Filed: May 2, 1989

Related U.S. Application Data

[62] Division of Ser. No. 92,212, Sep. 2, 1987, Pat. No. 4,871,612.

[30] Foreign Application Priority Data

Sep. 5, 1986 [JP] Japan ................................ 61-136966
Oct. 17, 1986 [JP] Japan ................................ 61-247106
Oct. 24, 1986 [JP] Japan ................................ 61-163018

[51] Int. Cl.$^5$ .................... B29C 45/14; B29C 45/16
[52] U.S. Cl. ................................. 264/134; 264/102; 264/240; 264/257; 264/328.6; 264/45.3; 521/902
[58] Field of Search .............. 264/102, 255, 134, 257, 264/240, 328.6, 45.3; 428/269, 297, 303, 304.4, 319.7, 422.8; 521/115, 116, 128, 129, 131, 160, 172, 173, 177, 56, 59, 902

[56] References Cited

U.S. PATENT DOCUMENTS

| | | | |
|---|---|---|---|
| 2,959,511 | 11/1960 | Finger | 264/257 |
| 2,978,376 | 4/1961 | Hulse | 264/257 |
| 3,137,750 | 6/1964 | Gringas | 264/257 |
| 3,446,686 | 5/1969 | Butler et al. | 156/224 |
| 3,817,806 | 6/1974 | Anderson | 264/512 |
| 3,989,781 | 11/1976 | Chant | 264/257 |
| 3,993,608 | 6/1974 | Wells | 428/313.9 |
| 4,052,241 | 10/1977 | Walter | 156/245 |
| 4,073,997 | 2/1978 | Richards et al. | 428/317.7 |
| 4,123,488 | 10/1978 | Lawson | 264/257 |
| 4,201,612 | 5/1980 | Figge et al. | 156/224 |
| 4,201,823 | 5/1980 | Russell | 264/255 |
| 4,270,944 | 6/1981 | Flaskett | 156/228 |
| 4,374,229 | 2/1983 | Dunnavant et al. | 525/28 |
| 4,435,349 | 3/1984 | Dominquez | 264/257 |
| 4,477,405 | 10/1984 | Makhlouf | 264/279 |
| 4,584,325 | 4/1986 | Smith | 264/121 |
| 4,610,835 | 9/1986 | Ghavamikia | 264/257 |
| 4,666,544 | 5/1987 | Whiteside et al. | 156/212 |
| 4,692,291 | 9/1987 | Angell | 264/102 |
| 4,810,444 | 3/1989 | Alberino | 264/102 |

FOREIGN PATENT DOCUMENTS

| | | |
|---|---|---|
| 2486872 | 1/1982 | France . |
| 2545039 | 11/1984 | France . |
| 57-29422 | 2/1982 | Japan . |
| 57-29436 | 2/1982 | Japan . |

OTHER PUBLICATIONS

Dan Borgnaes, S. F. Chappell and T. C. Wilkinson, RIMing of Low Viscosity Crosslinkable Alcohols with Diisocyanates, pp. 381–386.

Borgnaes et al., J. Elastomers Plast, vol. 16, No. 4, pp. 237–255, 1984.

D. G. Gluck et al., Journal of Cellular Plastics, "Glass Fiber Reinforced Isocyanurate-Urethane Foams", vol. 16, No. 3, pp. 159–167, May/Jun. 1980.

*Primary Examiner*—Jay H. Woo
*Assistant Examiner*—Jeremiah F. Durkin, II
*Attorney, Agent, or Firm*—Oliff & Berridge

[57] ABSTRACT

A method for manufacturing an interior member for vehicles comprises the steps of laying a surface layer in a cavity of a mold, placing a reinforcing fiber mat onto the surface layer, compressing the surface layer and the reinforcing fiber mat in the mold, injecting raw material for obtaining a polyisocyanurate and demolding an integrally-molded interior member from the mold after the completion of a reaction of the raw material. The raw material comprises a trimerization catalyst, a polyol and a polyisocyanate. The amount of raw material is determined so that the density of the obtained polyisocyanurate is 1.2 to 1.9 times as much as the density of the same polyisocyanurate in its free foaming state.

16 Claims, 4 Drawing Sheets

PRIOR ART

METHOD OF MANUFACTURING AN INTERIOR MEMBER FOR VEHICLES

This is a division of application Ser. No. 07/092,212 filed Sept. 2, 1987 now U.S. Pat. No. 4,871,612.

BACKGROUND OF THE INVENTION

This invention relates to an improved interior member for vehicles and also to a method for its manufacture.

The interior member is required for absorbing shock to a driver or a passenger, for maintaining a good surface feeling and appearance and furthermore for ornamental purposes. It is, for example, used for a knee pad 10 and an instrument panel 11 both shown in FIG. 6 as well as for door trim, quarter trim, a console lid, a center pillar, a pillar garnish or the like.

The interior members generally used are: (1) one composed of only rigid plastic with proper surface patterns; (2) one including layers of semi-rigid polyurethane foam (so-called spray skin foam), a surface film formed by transferring from the coated die surface on the die and a metal insert layer; (3) one made of rigid plastic with fluffed surface; (4) one including a rigid plastic substrate covered with a plastic surface film; and (5) one including layers of a metal insert, semi-rigid polyurethane foam and a plastic surface film. An example of the interior member widely used is shown in FIG. 7, in which a cushion pad 14 is formed between a metal insert (a steel plate) 12 and a surface layer 16. This metal insert 12 is used for absorbing impact, as in a knee pad, and for maintaining its shape, as in a console lid.

The above interior members, however, have the following problems. As for the members (1), (3) and (4), especially for the member (1), the surface feeling lacks softness. Moreover, the manufacturing processes, especially that for surface preparation, of the members (3) and (4) are rather complicated. As for the members (2) and (5), the metal insert increases the weight and cost of the interior member, and it takes much time to form polyurethane foam.

Since an instrument panel often has leather like grained patterns, other interior members of the vehicle such as a pillar garnish are desired to have the same patterns. The prior art interior members for the pillar garnish or the like, however, can obtain only indistinct grained patterns.

A fabric is generally used as a surface material for seats of a vehicle because of its good surface appearance and feeling. In order to totally coordinate the interior parts of the vehicle, a pillar garnish uses an interior member, made of a surface layer, and a rigid plastic substrate, where the surface layer is composed of the fabric surface and flexible polyurethane foam. This member, however, has problems: it takes time to integrate the surface layer to the substrate; and, because the surface layer prevents vacuum forming, the member can be applied only on interior parts with a simpler shape, Therefore, total decorative coordination of various interior parts is difficult.

SUMMARY OF THE INVENTION

Accordingly, one object of the invention is to provide an improved interior member for vehicles, which has good surface appearance and feeling, which is lightweight and whose construction is less complicated and manufacture is less costly.

Another object of the invention is to provide a simple method for manufacturing the interior member for vehicles.

A further object of the invention is to provide an interior member for vehicles which is thin and which has clear and fine surface patterns, such as leather like grain.

A still further object of the invention is to provide an interior member for vehicles by which the decorative interior parts of a vehicle can be totally coordinated.

The above and other related objects are realized by an interior member for vehicles which includes a substrate containing a reinforcing fiber mat permeated with a polyisocyanurate, and a surface layer integrally formed on the substrate. Here, the polyisocyanurate is produced by polyol and polyisocyanate reacting in the presence of a trimerization catalyst. This material is characterized in that the density of the polyisocyanurate in the substrate is 1.2 to 1.9 times as much as the density of the same polyisocyanurate in its free foaming state. The surface layer may include non-foamed plastic as an outer layer and foamed plastic as an inner layer, which are formed by melting a plastic powder in a heated mold. Alternatively the surface layer may include layers of a fabric, a resilient foam and a thermoplastic resin sheet.

Those objects are also attained by a manufacturing method including the steps of:

(a) laying a desired surface layer in a cavity of a mold;

(b) placing a reinforcing fiber mat onto the surface layer;

(c) pressing the surface layer and the reinforcing fiber mat in the mold;

(d) injecting raw material for obtaining a polyisocyanurate into the cavity of the mold, the raw material including a trimerization catalyst, a polyol and a polyisocyanate, the amount of the injected raw material being so determined that the density of the obtained polyisocyanurate is 1.2 to 1.9 times as much as the density of the same polyisocyanurate in its free foaming state; and (e) demolding an integrally-molded interior member from the mold after the completion of the reaction of the raw (polyisocyanurate) material.

Since the substrate of the interior member of the invention consists of a reinforcing fiber mat permeated with polyisocyanurate, the interior member can be of lower weight than a conventional interior member whose substrate contains a heavy metal insert. For example, a knee pad of this invention weighs half as much as a conventional one. Furthermore, it is possible to decrease a thickness of the substrate because of its sufficient strength.

The density of the polyisocyanurate in the substrate is 1.2 to 1.9 times as much as that in its free foaming state. Thus, the substrate possesses both appropriate rigidity and sufficient strength. Namely, it normally maintains the shape of the interior member, but deforms in response to impact and collapses in response to an especially great impact so as to absorb or decrease the impact for protecting a driver or a passenger.

Since it is of viscosity in the initial state of the reaction, the polyisocyanurate material injected into the mold can easily and homogeneously permeate the reinforcing fiber mat. Therefore, the substrate of this interior member contains uniform properties. While curing the polyisocyanurate material to form a substrate, a surface layer and the substrate are integrally molded by the adhesive effect of the polyisocyanurate itself and, as occasion demands, by an adhesive applied on the surface layer. Thus, the process of manufacturing the interior member is neither complicated nor costly.

The good surface appearance and feeling is obtained by covering the substrate with an appropriate surface layer. When the surface layer consists of non-foamed plastic as an outer layer and the inner layer of foamed plastic, the good surface feeling is obtained by its outer layer and the softness is obtained by its inner layer. Since these layers are formed by melting plastic powder in a heated mold, it can easily have clear and fine grained patterns on its surface by applying the patterns in the mold. When the surface layer consists of layers of a fabric, a resilient foam and a thermoplastic resin sheet, the good surface appearance and feeling is obtained by the fabric and the resilient foam. The thermoplastic resin sheet makes it possible to vacuum-form the surface layer. Thus, an interior member of a vehicle having a complicated shape can be also formed without difficulty. Since the thermoplastic resin sheet is used as the innermost layer, it prevents the polyisocyanurate material from permeating the resilient foam of the surface layer, thus preventing the good surface feeling from deteriorating. In either compositions of the surface layer, it is possible to totally coordinate the interior parts of a vehicle.

BRIEF DESCRIPTION OF DRAWINGS

The invention may be best understood by referring to the following detailed description of preferred embodiments and the accompanying drawings, wherein like numerals denote like elements and in which.

DETAILED DESCRIPTION OF PREFERRED EMBODIMENTS

Hereafter preferred embodiments of the invention will be described in detail according to the attached drawings.

Figure 1:
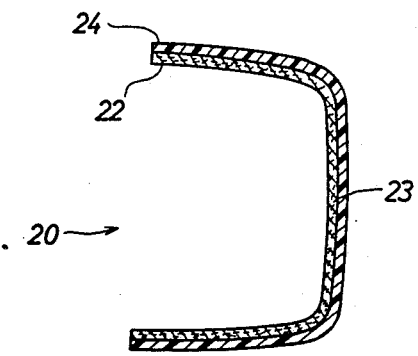
FIG. 1 is a sectional view of an interior member in a first embodiment of the invention.

FIG. 1 is a sectional view of an interior member 20 in a first embodiment which consists of a substrate 22 and a surface layer 24. The substrate 22 is formed by permeating a poly-isocyanurate through a reinforcing fiber mat 23. The poly-isocyanurate is obtained by the reaction of a polyol and a polyisocyanate in the presence of a trimerization catalyst. The amount of the polyisocyanurate is so determined that the density of the polyisocyanurate in the substrate is 1.2 to 1.9 times as much as that in its free foaming state.

The trimerization catalyst used may be any of a carboxylate, a tertiary amine, a base or alkaline inorganic salt, an alkali metal alcoholate, a phosphine and a quaternary ammonium salt. The carboxylate is, for example, an alkali metal salt, a lead salt or an iron salt of carboxylic acid. The tertiary amine is, for example, a trialkylamine or a dialkylaminoalkylphenol. The inorganic salt is, for example, potassium hydroxide or sodium carbonate. The phosphine is, for example, triethyl phosphine. Especially, the alkali metal salt of a carboxylic acid containing 1 to 18 carbon atoms or the quaternary ammonium salt is preferable. Dibutyltin dilaurate can be used as a subsidiary catalyst.

The polyol used may be any of ethylene glycol, diethylene glycol, neopentyl glycol, 1,6-hexanediol, 1,4-butanediol, 1,4-cyclohexanedimethanol, glycerol, trimethylolpropane and pentaerythritol. A polyester polyol or a polyether polyol prepared from the above polyols can also be used as the polyol.

The polyisocyanate used may be one or more selected from the group consisting of an aliphatic polyisocyanate, an alicyclic polyisocyanate and an aromatic polyisocyanate. The aliphatic polyisocyanate is, for example, hexamethylenediisocyanate. The alicyclic polyisocyanate is, for example, isophoronediisocyanate. The aromatic polyisocyanate is, for example, tolylenediisocyanate (TDI), diphenylmethanediisocyanate (MDI), naphthylenediisocyanate or xylylene diisocyanate. Especially the aromatic polyisocyanate such as TDI or MDI is preferable. The aromatic polyisocyanate may be used as crude TDI, crude MDI (polymethylenepolyphenylisocyanate) or modified MDI (carbodiimide modification or polyol modification). The amount of the polyisocyanate used is 250 to 3,000—preferably 1,500 to 2,500—on an isocyanate index.

The reinforcing fiber mat 23 preferably contains long glass-fibers, averaging 15 through 20 microns ($\mu$m) in average diameter and over 50 mm in average length. This reinforcing fiber mat 23 may be used in one sheet or in plural layers according to a target thickness of the substrate 22. A subsidiary reinforcement by such strong fibers as carbon-fibers or KEVLAR (a high strength aramid) fibers (trade name of DuPont) can be used together with the ordinary glass fiber mat in parts requiring greater strength.

The amount of the polyisocyanurate to be permeated through the reinforcing fiber mat 23 is so determined that the density of the polyisocyanurate in the substrate 22 is 1.2 to 1.9 times as much as the density of the same polyisocyanurate in its free foaming state. Here, free foaming refers to foaming which does not occur in a closed mold and in which the polyisocyanurate is not permeated in the reinforcing fiber mat. The density of the polyisocyanurate in the substrate 22 is calculated as (weight of the polyisocyanurate)/(clearance volume between fibers of the reinforcing fiber mat).

In calculating the density, the weight of the polyisocyanurate is equal to the total weight of raw material injected in the mold for obtaining the polyisocyanurate between the reinforcing fiber mat 23. The clearance volume between fibers of the reinforcing fiber mat 23 is, for example, calculated as follows.

First, the weight x of a vessel containing water is measured. Then measured is the total weight y when a reinforcing fiber mat A of a certain size is suspended in the water. The volume v1 of the reinforcing fiber mat A is calculated from its outside dimensions. The total volume V1 of a reinforcing fiber mat 23 used for the interior member 20 of a vehicle is calculated from its outside dimensions, the engineering drawings or the dimension of the substrate 22. The volume z occupied by fibers in the reinforcing fiber mat A is acquired by an equation $z=(y-x)/d_o$, where $d_o$ is the density of water and is equal to unity. The clearance volume v2 between fibers of the reinforcing fiber mat A is found from an equation $v2=v1-z$. As a result, the total clearance volume V between fibers of the reinforcing fiber mat 23 used for the interior member 20 of a vehicle is calculated by an equation $V=v2\cdot V1/v1$.

Taking account of its moldability and decorative effects as an interior member 20 of the vehicle, the composition of the surface layer 24 is selected from: a plastic sheet such as polyvinyl chloride resin; a sheet of plastic foam; laminated layers of a fabric and a plastic film; and laminated layers of a fabric, a sheet of plastic foam (flexible polyurethane foam is an example) and a plastic film.

Examples of the composition of the polyisocyanurate material are shown below. Here, "part" refers to weight and MW stands for a molecular weight.

EXAMPLE 1

| Polyol: | polyether polyol prepared from glycerol functional groups 3 MW 3,000 | 100 parts |
|---|---|---|
| Polyisocyanate: | modified MDI free NCO contained 29% | 239 parts |
| Trimerization Catalyst: | potassium octylate | 0.3 part |
| Isocyanate Index: | | 1,650 |

EXAMPLE 2

| Polyol: | polyether polyol prepared from ethylene glycol functional groups 2 MW 3,000 | 100 parts |
|---|---|---|
| Polyisocyanate: | modified MDI free NCO contained 29% | 187 parts |
| Trimerization Catalyst: | potassium octylate | 0.3 part |
| Isocyanate Index: | | 2,000 |

EXAMPLE 3

| Polyol: | polyether polyol prepared from glycerol functional groups 3 MW 1,500 | 100 parts |
|---|---|---|
| Polyisocyanate: | modified MDI free NCO contained 29% | 420 parts |
| Trimerization Catalyst: | potassium octylate | 0.1 part |
| Subsidiary Catalyst: | dibutyltin dilaurate | 0.1 part |
| Isocyanate Index: | | 1,500 |

Various properties of the substrate 22 using the polyisocyanurate material of Example 1 are shown in Table 1.

TABLE 1

| Density of Substrate (g/cm³) | 1.15 | 1.18 | 1.22 | 1.30 |
|---|---|---|---|---|
| Content of Reinforcing Fiber Mat* (weight %) | 0 | 12.7 | 36.9 | 57.7 |
| Density of Polyisocyanurate in Substrate = A (g/cm³) | 1.15 | 1.08 | 0.91 | 0.73 |
| Density of Polyisocyanurate in Free Foaming = B (g/cm³) | | | | |
| A/B | 1.91 | 1.81 | 1.51 | 1.22 |
| Modulus of Bending Elasticity (10⁴ kg/cm²) | 1.8 | 4.0 | 5.6 | 7.5 |
| Bending Strength (kg/cm²) | 650 | 1,200 | 1,800 | 2,400 |
| Tensile Strength (kg/cm²) | 430 | 600 | 1,000 | 1,500 |
| Elongation (%) | 5 | 3 | 2 | 1 |
| Izod Impact Strength with Notch (kg · cm/cm) | 8 | 20 | 38 | 45 |

*The fiber mat is a continuous strand mat of long glass fibers.

Figure 2:
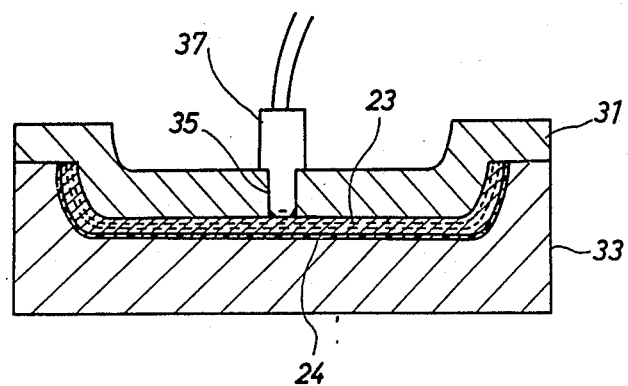
FIG. 2 is a sectional view illustrating a process for manufacturing the interior member in the first embodiment.
Figure 3:
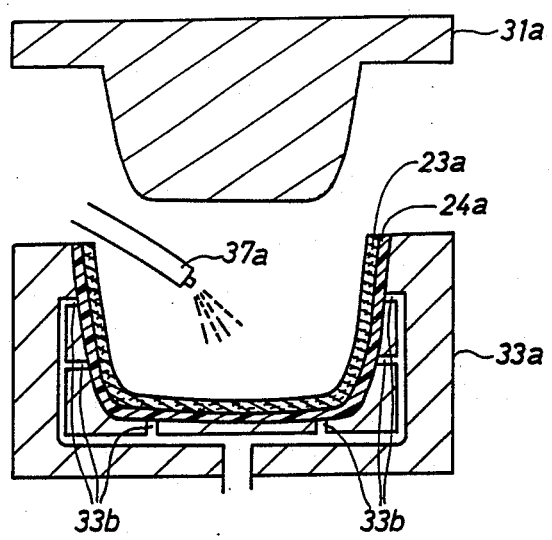
FIG. 3 is a sectional view illustrating another process for manufacturing the interior member in the first embodiment.

Processes for manufacturing the above interior member 20 for a vehicle in the first embodiment are explained according to FIGS. 2 and 3.

FIG. 2 is a sectional view showing one process for manufacturing the interior member 20. A mold is composed of a lower mold half 33 and a upper mold half 31 having an inlet 35. The lower mold half 33 and the upper mold half 31 have cavity faces so as to form a cavity in which an interior member 20 is shaped when closing the lower mold half 33 with the upper mold half 31.

First, the surface layer 24 is laid in the cavity of the lower mold half 33. This lower mold half 33 may be preheated to 60 through 80° C. Second, the reinforcing fiber mat 23 is placed onto the surface layer 24. Alternatively, the fiber mat 23 can be attached under the upper mold half 31 by adhesive tape. The reinforcing fiber mat 23 may be previously made in a desired shape before it is set on the lower mold half 33, or a plain fiber mat 23 may be placed on the lower mold half 33 to be given the shape by the lower mold half 33 and the upper mold half 31. Necessary hooks or fasteners for attaching the interior member 20 to the vehicle body are set in this stage at appropriate positions. Third, the lower mold half 33 is sealed with the upper mold half 31 so as to compress the surface layer 24 and the reinforcing fiber mat 23. Fourth, raw material for obtaining polyisocyanurate is injected from the inlet 35 into the cavity of the closed mold. Here, the material includes a polyol, a polyisocyanate and a trimerization catalyst. A specific type of injection nozzle 37 can be utilized in which the polyol and the polyisocyanate may be separately led and shot into each other under high pressure at the inlet 35 so as to be injected simultaneously. At that time, if the pressure within the cavity is reduced to 250 to 350 mmHg, the flow of the polyisocyanurate material is not prevented by the pressure in the cavity. Thus, the material can be uniformly and homogeneously permeated through the reinforcing fiber mat 23 so as to obtain an interior member 20 with a complicated shape or a thin interior member 20.

The amount of the polyisocyanurate material injected is so determined that the density of the polyisocyanurate obtained by the reaction in the cavity is 1.2 to 1.9 times as much as the density of the same polyisocyanurate in its free foaming state. For example, if the density of the polyisocyanurate in its free foaming state is 0.6 g/cm³, the amount is determined to obtain 0.72 to 1.14 g/cm³ of the density of the polyisocyanurate in the cavity. To be concrete, the amount of the polyisocyanurate material injected is calculated simply by (density of the polyisocyanurate material)·(the total clearance volume between fibers of the reinforcing fiber mat).

The polyisocyanurate material injected into the cavity is then homogeneously permeated through the reinforcing fiber mat 23 and cured by catalysis of the trimerization catalyst of the material so as to form a substrate 22 while the surface layer 24 adheres to the substrate 22. Lastly, the integrally-molded interior member 20 is demolded.

The weight of the upper mold half 31 itself is enough for a locking pressure on sealing the lower mold half 33. Even if clamping of the upper mold half 31 is necessary, an ordinary injection pressure (usually under 2 kg/cm) is sufficient for the clamping pressure. To strongly adhere the surface layer 24 onto the substrate 22, an adhesive may be applied on the surface layer 24 before the polyisocyanurate injection. The adhesive may be any of an urethane adhesive, an epoxy adhesive and an acrylic adhesive. In the first embodiment, the time period from the injection time of the polyisocyanurate material to the demolding time of the obtained interior member 20 is 30 to 60 seconds.

FIG. 3 is a sectional view showing another process for manufacturing the above interior member 20 of the first embodiment. A mold consists of a lower mold half 33a having holes 33b for making a vacuum, and an upper mold half 31a. Since the process according to FIG. 3 is almost the same as that according to FIG. 2, here only a brief explanation is given. First, a surface layer 24a is vacuum-formed in the lower mold half 33a. Second, a reinforcing fiber mat 23a is placed on the surface layer 24a. Third, raw material for obtaining a polyisocyanurate is injected by an injection nozzle 37a. Fourth, the lower mold half 33a is covered with the upper mold half 31a so as to complete the reaction of the material. Lastly, an integrally-molded interior member 20 is demolded. The injection of polyisocyanurate material may follow the closing of the lower mold half 33a by the upper mold half 31a depending on the reaction speed and the process facilities.

Figure 4:
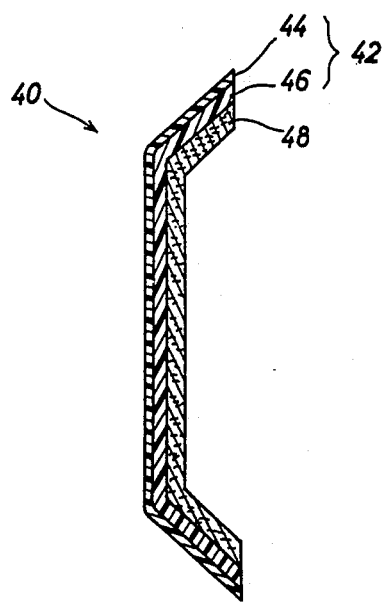
FIG. 4 is a sectional view of an interior member in a second embodiment of the invention.

A second embodiment is now described according to FIG. 4.

FIG. 4 is a sectional view of a pillar garnish as an interior member 40 according to the invention. It consists of a surface layer 42 and a substrate 48, where the surface layer 42 includes non-foamed plastic as an outer layer 44 and foamed plastic as an inner layer 46. These two layers 44 and 46 are made of the same or different resin (for example, flexible polyvinyl chloride resin or its copolymer) and are formed by melting plastic powder in a heated mold. Generally, the thickness of the non-foamed plastic layer 44 is 0.3 to 0.5 mm and that of the foamed plastic layer 46 is 2.0 to 3.0 mm. The degree of foaming of the foamed plastic layer 46 is determined according to its properties and the shape or variety of the interior member 40. A process of manufacturing the surface layer 42 is briefly described.

A lower mold having desired patterns such as leather like grain is preheated. Plastic powder for forming the non-foamed plastic layer 44 is placed in the lower mold and the lower mold is then further heated. The plastic powder is melted by the heating and then is solidified by decreasing the temperature so as to form the non-foamed plastic layer 44. Another plastic powder for forming the foamed plastic layer 46 is added on the solidified layer 44 and the lower mold is again heated. The plastic powder forms the foamed plastic layer 46 in the same manner as above and thus the surface layer 42 is obtained. The substrate 48 is then formed on the surface layer 42 as in the first embodiment to obtain the pillar garnish 40.

Figure 5:
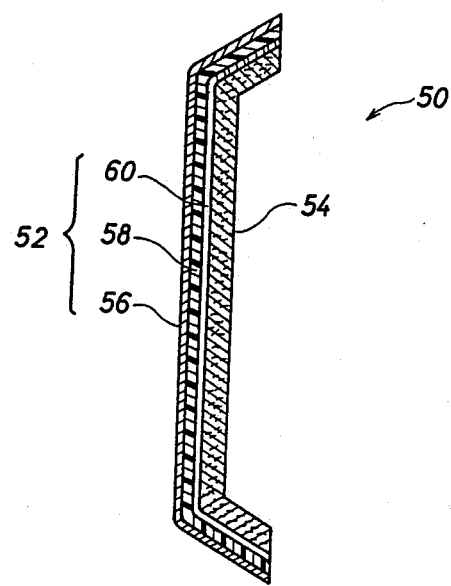
FIG. 5 is a sectional view of an interior member in a third embodiment of the invention.
Figure 6:
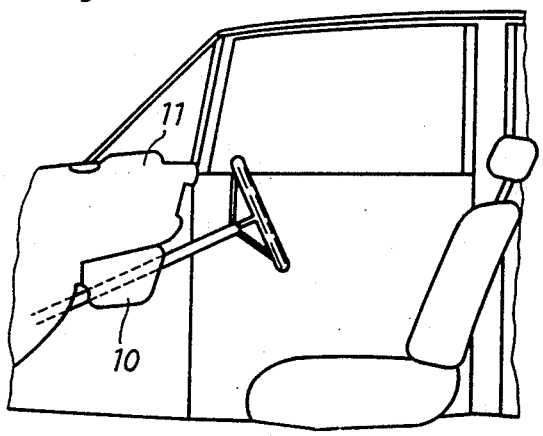
FIG. 6 is a side view of the inside of an automobile.
Figure 7:
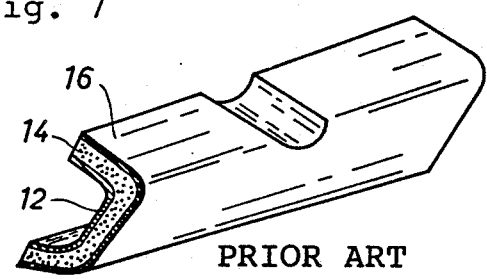
FIG. 7 is a perspective view of a prior art knee pad, with the section.

A third embodiment is now described according to FIG. 5.

FIG. 5 is a sectional view of another pillar garnish 50 as a third embodiment of an interior member 50 of the invention. The interior member 50 also consists of a surface layer 52 and a substrate 54, as in the second embodiment. But the surface layer 52 includes layers of a fabric 56, a resilient foam 58 and a thermoplastic resin sheet 60. They are laminated with an adhesive or are press-formed by heat melting of the resilient foam 58. The surface layer 52 is shaped in a desired form by heating so as to soften the thermoplastic resin sheet 60, thus allowing vacuum-forming in the mold. Good surface appearance and feeling is obtained by the fabric 56 and the resilient foam 58. Since the thermoplastic resin sheet 60 is used as the innermost layer, it prevents the polyisocyanurate material from permeating into the resilient foam 58 of the surface layer 52, thus preventing the good surface feeling from deteriorating. Using the thermoplastic resin sheet 60 makes it possible to vacuum-form the surface layer. Namely, an interior part of a vehicle having a complicated shape can be also formed without difficulty. The resilient foam 58 may be flexible polyurethane foam, and the thermoplastic resin sheet 60 may be a polyurethane film which can easily adhere to the polyisocyanurate. The substrate 54 is the same as that of the first embodiment.

Although the invention has been described with reference to specific embodiments thereof, it will be apparent that numerous changes and modifications may be made therein without departing from the scope of the invention. It is, therefore, to be understood that it is not intended to limit the invention to the embodiments shown but only by the scope of the claims which follow.

What is claimed is:

1. A method for manufacturing an interior member for vehicles, comprising steps of:
   (a) laying a surface layer in a cavity of a mold;
   (b) placing a reinforcing fiber mat onto said surface layer;
   (c) compressing said surface layer and said reinforcing fiber mat in the mold;
   (d) injecting raw material for obtaining a polyisocyanurate into the cavity of the mold, said raw material comprising a trimerization catalyst, a polyol and a polyisocyanate, the amount of said raw material being so determined that the density of the obtained polyisocyanurate is 1.2 to 1.9 times as much as the density of the same polyisocyanurate in its free foaming state, the amount of polyisocyanate used for obtaining said polyisocyanurate being from 250 to 3,000 on the isocyanate index; and
   (e) demolding an integrally-molded interior member from the mold after the completion of the reaction of the raw material.

2. A method as claimed in claim 1, wherein said reinforcing fiber mat used in step (b) comprises glass-fibers averaging 15 through 20 microns in diameter and over 50 mm in length.

3. A method as claimed in claim 1 wherein said trimerization catalyst used in step (d) is at least one compound selected from the group consisting of a carboxylate, a tertiary amine, an inorganic salt, a phosphine and a quaternary ammonium salt.

4. A method as claimed in claim 3, wherein said trimerization catalyst is an alkali metal salt of a carboxylic acid containing 1 to 18 carbon atoms.

5. A method as claimed in claim 1, wherein dibutyltin dilaurate is used in step (d) as a subsidiary catalyst.

6. A method as claimed in claim 1, wherein said polyol used in step (d) is at least one compound selected from the group consisting of ethylene glycol, diethylene glycol, neopentyl glycol, 1,4-butanediol, 1,6-hexanediol, 1,4-cyclohexanedimethanol, glycerol, trimethylolpropane and pentaerythritol.

7. A method as claimed in claim 1, wherein said polyol is selected from the group consisting of polyester polyol and polyether polyol.

8. A method as claimed in claim 1, wherein said polyisocyanate used in step (d) is at least one compound selected from the group consisting of an aliphatic polyisocyanate, an alicyclic polyisocyanate and an aromatic polyisocyanate.

9. A method as claimed in claim 8, wherein said aliphatic polyisocyanate is hexamethylenediisocyanate.

10. A method as claimed in claim 8, wherein said alicyclic polyisocyanate is isophoronediisocyanate.

11. A method as claimed in claim 8, wherein said aromatic polyisocyanate is selected from the group consisting of tolylenediisocyanate, diphenylmethanedisocyanate, naphthylenediisocyanate and xylilenediisocyanate.

12. A method, as claimed in claim 1, wherein said mold is pre-heated to between 60° and 80° C. step (a).

13. A method as claimed in claim 1, wherein said polyol and said polyisocyanate used in step (d) are separately led and are shot into each other under high pressure at an inlet of said mold so as to be injected simultaneously.

14. A method as claimed in claim 1, wherein said mold is a closed mold and the pressure of said closed mold is maintained within the range of from 250 to 350 mmHg during injection of said polyisocyanurate material in step (d).

15. A method as claimed in claim 1, wherein an adhesive is applied on said surface layer in step (a).

16. A method as claimed in claim 1, wherein said mold comprises a lower mold half having a lower mold half cavity face and an upper mold half having an upper mold half cavity face, said lower mold half is sealed with said upper mold half cavity face to form a cavity in which said interior member is shaped after the injection of said polyisocyanurate material in step (d) so as to complete the reaction of said material in step (e).

* * * * *